May 30, 1950  W. L. HANSEN ET AL  2,509,391
NUTATION TYPE MOTOR
Filed July 3, 1948  4 Sheets-Sheet 2
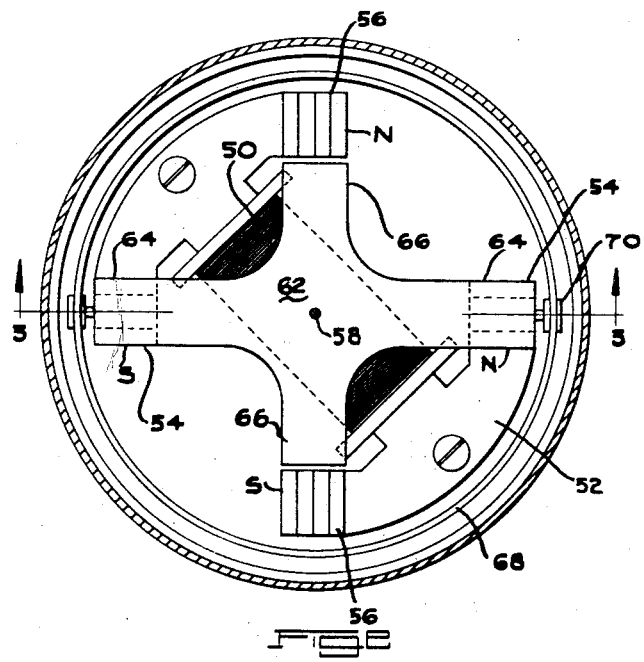
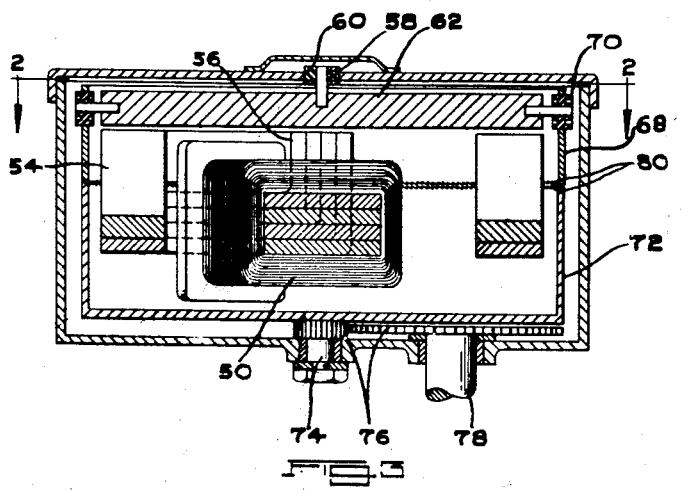
INVENTORS
WILLIAM L. HANSEN
& JAMES M. HUSH
BY
Toulmin & Toulmin
ATTORNEYS

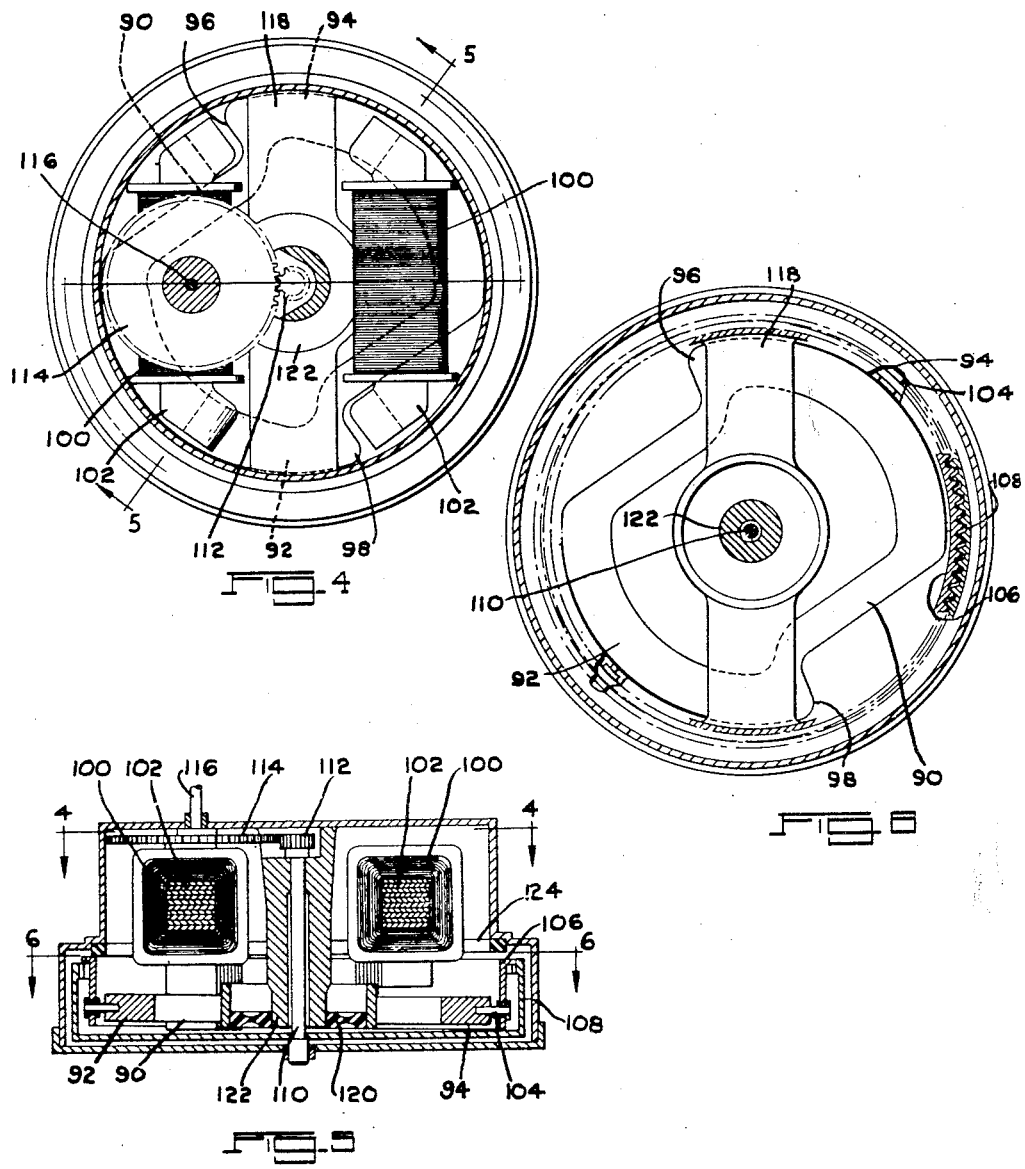

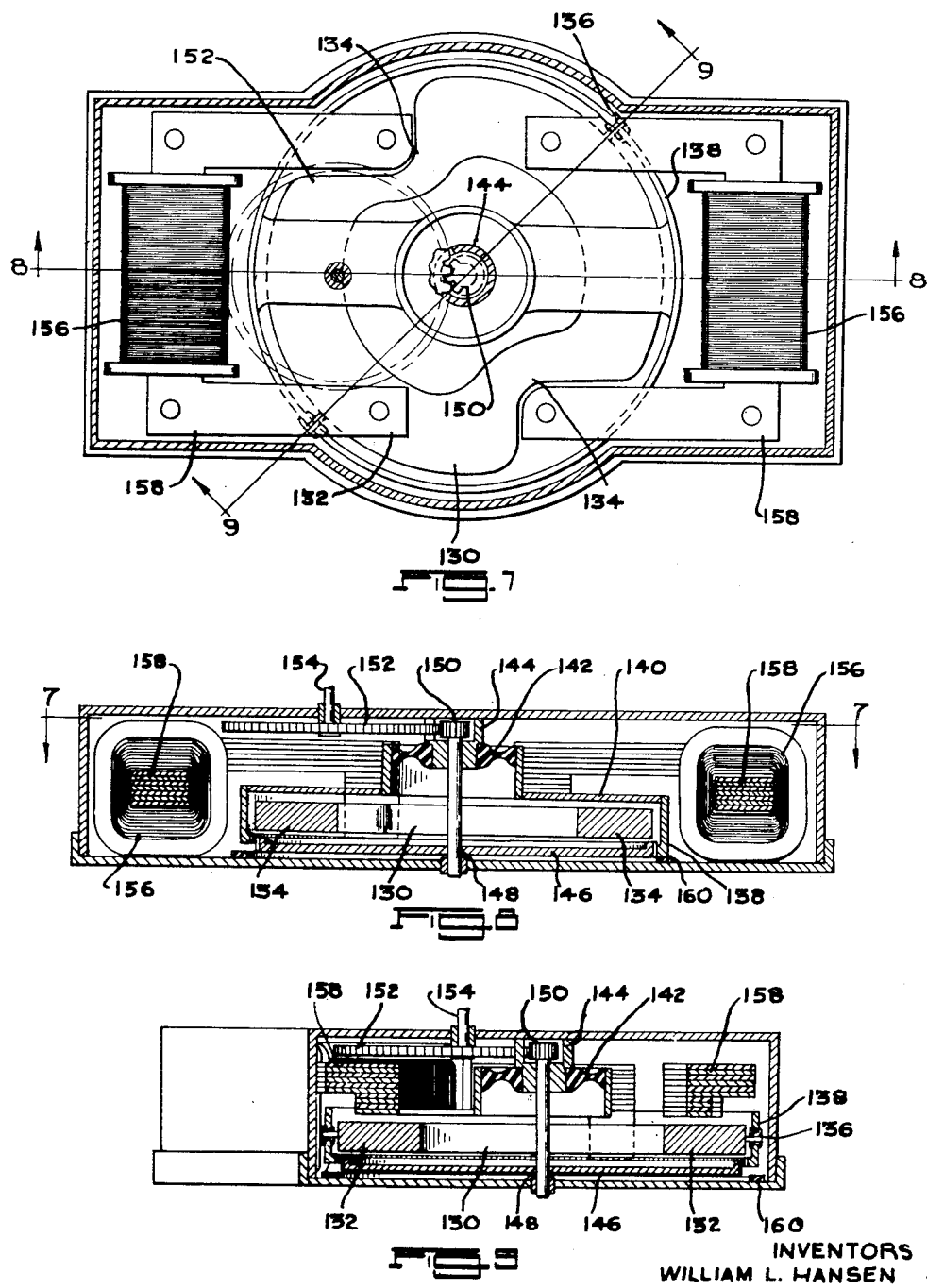

Patented May 30, 1950

2,509,391

UNITED STATES PATENT OFFICE 2,509,391

NUTATION TYPE MOTOR

William L. Hansen, Princeton, Ind., and James M. Hush, Denver, Colo., assignors to Hansen Manufacturing Company, Princeton, Ind., a corporation of Indiana Application July 3, 1948, Serial No. 36,944

10 Claims. (Cl. 172—36)

This invention relates to electric motors, and particularly to small synchronous type electric motors, especially adapted for driving clocks, timers, and the like.

In the usual type small synchronous clock or timer motor, the rotary element revolves at high speed and useful work is taken therefrom by connecting the rotor shaft of the reduction gearing with an output shaft.

Due to the fairly high speed of operation of the rotor, such motors do not have as long a service life as is desirable, because the bearings for the said rotor shaft tend to become worn and loose.

One particular object of this invention is to provide a construction for a synchronous electric motor which eliminates rapidly rotating members.

A still further object is the provision of a new and novel method of transforming pulsating or alternating electric power into mechanical power.

A still further object of this invention is to provide a synchronous electric motor construction including a mechanical phase splitting means whereby the driven portion of the motor will rotate.

These and other objects and advantages will become apparent upon reference to the following description taken in connection with the accompanying drawings in which:

Figure 2 is a plan section through another type of motor as indicated by the line 2—2 on Figure 3;

Figure 3 is a vertical section indicated by the line 3—3 on Figure 2;

Figure 4 is a plan section indicated by the line 4—4 on Figure 5 of still another modification;

Figure 5 is a vertical section through the motor of Figure 4 and as indicated by the line 5—5 on Figure 4;

Figure 6 is a plan section indicated by the line 6—6 on Figure 5;

Figure 7 is a plan section indicated by the line 7—7 on Figure 8 and showing still another form of the device;

Figure 8 is a vertical section indicated by the line 8—8 on Figure 7; and

Figure 9 is a vertical section indicated by the line 9—9 on Figure 7.

Figure 1:
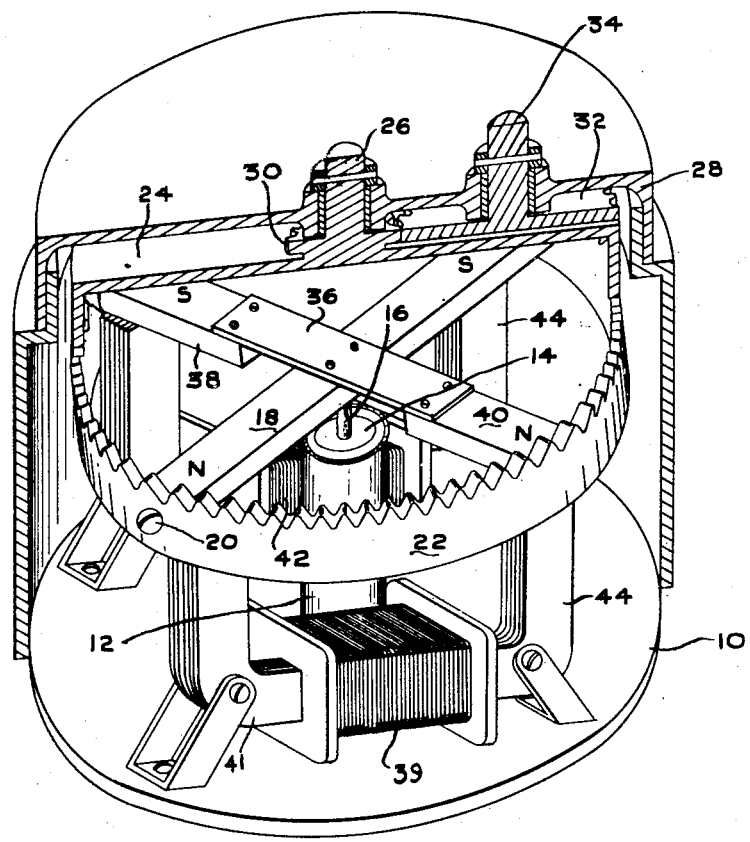
Figure 1 is a perspective view of one form of motor constructed according to this invention.

Referring to the drawings more in detail, the motor shown in Figure 1 comprises a casing including a base part 10, and upstanding centrally from the base part is a column 12 having a resilient member such as the rubberlike grommet 14 mounted in its upper end. Secured to the grommet 14 is a shaft 16, and carried on the shaft 16 is a bar magnet 18 having its opposite ends oppositely magnetized.

Secured to the ends of the bar magnet 18 as by the screws 20 is a gear ring or crown gear 22. Facing the crown gear 22 is another crown gear 24 which is rotatably mounted as by means of the shaft 26 which extends through the upper cover part 28 of the motor case. The crown gear 24 has connected therewith the pinion 30 which meshes with a larger gear 32 mounted on the output shaft 34 of the motor.

Extending substantially at right angles to the bar magnet 18 and secured thereto is a leaf spring 36 which carries at its opposite ends the short bar magnets 38 and 40. The bar magnets 38 and 40 extend to adjacent the inner periphery of the crown gear 22 and the outermost ends of the bar magnets are oppositely magnetized.

Supported on the base plate 10 are a pair of electro-magnetic structures including the coils 39 and laminated cores 41, the ends of the said cores extending upwardly to positions beneath the outermost ends of the bar magnets 38 and 40. The polarity of the ends of the bar magnets 18, 38 and 40 may be as indicated by the letters N and S as applied thereto in the drawings.

The electro-magnetic structures are arranged so that oppositely disposed pairs of the ends of the permanent magnets are alternately attracted toward the cores 44 and repelled therefrom. For example, on one-half cycle of energizing current for the coils 42 one of the "N" ends of the bar magnets is attracted toward the adjacent end of one of the cores 44, while the other "N" end is repelled from the said one core. Similarly, the bar magnet ends marked S are urged one toward and one away from the other core 44. On the next half cycle of energizing current for the coils 42 opposite conditions obtain and the thrusts on the several bar magnet ends are renewed.

The arrangement shown is effective in obtaining a mechanical phase splitting of the magnetic impulses delivered to the ends of the bar magnets on account of the resilient leaf spring 36. This comes about in the following manner: when either end of the bar magnet 18 is attracted toward the adjacent core 44, or repelled therefrom, the movement of the said bar magnet is accompanied by a corresponding movement of the crown gear 22 where it is attached to the end of the bar magnet. However, when either of the bar magnets 38 or 40 is either attracted toward or repelled from one of the cores 44, the movement of the said bar magnet is not accompanied by corresponding movement of the crown gear 22. This is due to the resilient connection of the bar magnets with the said crown gear and because of the resilient connection there must be a substantial movement of the bar magnet before the crown gear is moved. The movement of the crown gear thus follows the movements of the bar magnets 38 and 40 rather than being in synchronism therewith as is the case in connection with the bar magnet 18.

It will be evident that this mechanical arrangement results in an effective phase splitting arrangement which results in gyration or nutation of the crown gear 22. The crown gear 22 is axially spaced from the crown gear 24 and has a different number of teeth thereon. Thus, as the gear 22 nutates about its resilient support with the post 12 and is at the same time prevented from rotation thereabout, the gear 24 will be driven in rotation and will deliver power to the gears 30 and 32 to the output shaft 34.

It will be understood that the weights of the moving parts of the motor and the resilience of the supporting grommet 14 and of the leaf spring 36 are adjusted so that the actual period of oscillation of the said parts corresponds to the frequency of the energizing current supplied to the coils 42 so that a minimum amount of power is required for operating the motor.

It will also be apparent that the output shaft 34 will have one and only one direction of rotation when the motor is operated, and there will be no tendency for the motor to operate in a reverse direction. It will also be seen that there are no parts of the motor that will rotate at high speeds and accordingly the life of the bearings supporting the shafts 26 and 34 will be correspondingly lengthened.

Figures 2 and 3 show another arrangement of a nutating type motor wherein only a single coil 50 is employed for energizing the laminated core 52 having the end parts 54 and 56. Resiliently supported as by means of a shaft 58 and rubber-like grommet 60 is a vibratory element 62 which is formed in the shape of a cross and which has two end parts as at 64 overlying the core ends 54, and its other two end parts as at 66 positioned adjacent the end parts 56 of the core. The vibratory member 62 is magnetized as indicated by the letters N and S marked thereon.

A crown gear 68 is resiliently mounted by the grommet and pin arrangement 70 to the end parts 64 of the vibratory element 62. This crown gear, similarly to the crown gear 22 in Figure 1, is axially spaced from a second crown gear 72 which is mounted on a shaft 74 and connected by the gear 76 and an output shaft 78.

Teeth 80 on the two crown gears are adapted for meshing as the upper crown gear 68 is driven in nutating motion.

In operation, on one half cycle of energizing current for the coil 50, both of the pole ends of the core structure 52 at one end of the coil are north poles, while the two at the other end of the coil are south poles. Assuming the two at the upper left side of Figure 2 are both north poles, then the left hand one of the ends 64 of the vibratory member 62 will be attracted downwardly, while the upper one of the ends 66 of the member will be repelled upwardly. At the same time the lower one of the ends 66 of the vibratory member will be attracted downwardly, while the right hand one of the ends 64 of the said member will be repelled upwardly. This movement of the member 62 will be accompanied by an instantaneous movement of the crown gear 68 to follow the movement of the ends 64 of the member, and thereafter a delayed movement of the nutating gear in following the movement of the end parts 66 of the member. The delay in the last mentioned movement of the crown gear is brought about by the resilient connection between the said gear and the member 62 as represented by the pins and grommets 70. On the next half cycle of energizing current for the coil 50 the conditions of attraction and repulsion of the end parts of the member 62 are reversed and this brings about further nutating movement of the crown gear 68. As the coil 50 continues to be energized by successive half cycles of energizing current, the member 62 will continue to vibrate and the associated crown gear 68 will continue to nutate and thereby to drive the lower crown gear 72 in rotation.

Figures 4, 5 and 6 show another form a synchronous motor according to this invention may take. In these figures the vibratory member or armature comprises a ring 90 formed of a material which can be strongly permanently magnetized so as to have polarized areas at 92 and 94 of like polarity and other areas at 96 and 98 also polarized with like polarity but oppositely to the areas 92 and 94.

The ring is so shaped that there are recesses around the periphery thereof adjacent the polarized areas 96 and 98. For actuating the vibratory ring 90 there are provided a pair of electromagnetic structures comprising coils 100 and laminated magnetic frames 102.

As will be seen in Figure 4 the pole ends of the laminated structures 102 are arranged so that one each thereof is disposed over one of the polarized areas 92 or 94, while the others thereof extend to adjacent the polarized areas 96 and 98.

Resiliently supported on the vibratory ring 90 as by means of the pins and grommets indicated at 104 is a nutating drive member or gear 106. Reference to Figures 5 and 6 will show that the teeth on the gear 106 are externally thereof and that surrounding the said gear is an internal gear 108. The gear 108 is mounted on a shaft 110 which carries a pinion 112 that meshes with a gear 114 mounted on the output shaft 116. The gear 106 has connected therewith a transversely extending web part 118 which is mounted by means of the resilient rubber-like grommet 120 to a column 122 which also provides bearing support for the shaft 110. The grommet 120 permits nutating or gyratory movement of the gear 106 but prevents rotation thereof.

As in the case of the previously described modifications, energization of the coils 100 results in alternate attraction and repulsion of adjacent pairs of polarized areas of the ring 90. Due to the fact that the gear 106 is resiliently supported on the ring 90 on an axis extending through one pair of the polarized areas of the said ring, the gear will have a nutating and gyratory movement in response to vibratory movement of the ring 90.

The gears 106 and 108 have different numbers of teeth thereon and the gear 108 is thereby driven in rotation in response to the nutating movements of the gear 106.

As in the case of the previously described modifications the speed of rotation of the gear 106, the shaft 110 and the shaft 116 is quite low and long bearing life and quiet operation will result.

As a further means for insuring quiet operation of the motor shown in Figures 4, 5 and 6 there may be provided the annular rubberlike bumper ring 124 which forms a ledge around which the gear 106 rolls and thus eliminates the possible noise of generating metal to metal contact.

In Figures 7, 8 and 9 there is shown an arrangement of the motor which is somewhat similar to that shown in Figures 4, 5 and 6. In Figures 7, 8 and 9 the armature or vibratory member comprises a ring element 130 having the oppositely disposed and similarly polarized areas 132 and the other pair of oppositely disposed and similarly polarized areas 134, but the areas 134 are polarized oppositely to the areas 132.

Resiliently supported on the ring 130 as by means of the pins and grommets 136 is the internal gear 138. The gear 138 is resilient about an axis extending through the polarized areas 132 but is rigid about an axis at right angles thereto. The gear 138 includes the cross web portion 140 and the portion 140 surrounds the resilient rubberlike grommet 142 which is anchored to the hub 144 extending from one wall of the motor casing.

As will be seen in Figures 8 and 9 there is an external gear 146 adapted for engagement with the internal gear 138 as the latter nutates. The gear 146 is mounted on the shaft 148 which carries a pinion 150 that meshes with the gear 152 on the output shaft 154.

For causing the ring 130 to vibrate thereby to bring about nutating movement of the gear 140, there are provided a pair of electro-magnetic structures including coils 156 and the laminated magnetic frames 158. The frames 158 each have one pole end extending to a position over the polarized areas 132, while the other pole ends of the magnetic frames extend to adjacent the polarized ends 134. Upon energization of the coils 156 by an alternating current adjacent pairs of polarized areas of the ring 130 are alternately attracted and repelled from the pole ends of the magnetic frame 158.

As explained in connection with the previous modification this results in vibratory movement of the armature member 130 and this causes nutating movement of the internal gear 138 and therethrough the external gear 146 is driven at low speed.

Also, as in the case of the modification shown in Figures 4, 5 and 6, there is a resilient ring 160 provided which acts as a bumper for the nutating gear 138 and prevents the same from coming into metal to metal contact with the casing of the motor and thus provides for quiet operation.

From the foregoing description of the several modifications shown of this invention, it will be apparent that there is provided a new and improved method for transforming alternating or pulsating electric power into mechanical power and that this is accomplished with a minimum of inexpensive apparatus and without any part of the said apparatus operating at high speeds. The motors, accordingly, have long life and operate quietly.

It will be understood that this invention is susceptible to modification in order to adapt it to different usages and conditions and, accordingly, it is desired to comprehend such modifications within this invention as may fall within the scope of the appended claims.

We claim:

1. In an electric motor; a resiliently supported member having angularly spaced pairs of polarized areas, electro-magnetic means having poles adjacent said areas so that energization of said electro-magnetic means by an alternating current will cause said member to vibrate on its resilient support, a drive gear supported on said member and rigid therewith in the plane of vibration of one of said pairs of areas but resilient relative to said member in the plane of vibration of the other of said pairs of areas whereby said gear nutates when said member vibrates, and a driven gear rotatably supported so as to be in mesh with said gear as the latter nutates.

2. In an electric motor; a resiliently supported vibratory member having angularly spaced pairs of diametrically opposite polarized areas, electro-magnetic means having pole ends adjacent said areas whereby energization of said electro-magnetic means by an alternating current will cause said member to vibrate on its resilient support, a drive gear connected with said member on an axis extending through one pair of said polarized areas and rigid therewith, means resiliently urging said drive gear about said axis toward a predetermined position relative to said other pair of polarized areas, whereby said gear will nutate in response to vibratory movement of said member, and a driven gear positioned to be engaged and driven by said drive gear as the latter nutates.

3. In an electric motor; a resiliently supported vibratory member, first and second pairs of diametrically opposite polarized areas on said member, the poles of each pair being of like polarity and opposite to the polarity of the other pair and said pairs being angularly spaced from each other, electro-magnetic means energizable by alternating current to cause said member to vibrate on its resilient support, a gear resiliently connected with said member on an axis extending through one of said pairs of pole areas so as to be resilient relative to said member about said axis but rigid relative to said member about a line at right angles to said axis, and a driven gear rotatably supported in a position to be energized by said drive gear as the latter nutates in response to vibration of said member.

4. In an electric motor; a vibratory armature having a first pair of diametrically opposite areas of like polarity thereon and a second similarly arranged pair of the opposite polarity and angularly spaced from the said first pair, means resiliently supporting said armature, electro-magnetic means having pole areas adjacent said polarized areas so that energization of said electro-magnetic means by an alternating current will cause said armature to vibrate on its resilient support, a drive gear pivotally connected with said armature on an axis extending through one of said pairs of said polarized areas resilient means between said gear and armature urging them toward a predetermined relative position, said connection permitting movement of said gear relative to said armature about said axis but preventing movement of said gear relative to said armature about a line perpendicular to said axis whereby vibration of said armature will cause nutation of said gear, a driven gear positioned to be engaged by said drive gear as the latter nutates due to vibratory movement of said armature, and a resilient bumper ring for limiting the axial movement of said drive gear as it nutates.

5. In an electric motor; a driven gear, a drive gear, a rubberlike grommet supporting said drive gear so that nutating movement thereof will cause it to mesh with and to drive said driven gear, an armature means resiliently connecting said armature with said drive gear at diametrically opposite points so that movement of said armature about an axis through said points will be accompanied by delayed movement of said drive gear while movement of said armature about a line perpendicular to said axis will be accompanied by an instantaneous movement of said drive gear, a first pair of diametrically opposite polarized areas on said armature on said axis, a second pair of diametrically opposite polarized areas on said armature circumferentially spaced from said first pair, and electro-magnetic means having poles adjacent the polarized areas of said armature for causing said armature to vibrate about a line at an angle to said axis less than a right angle.

6. In an electric motor; a first crown gear rotatably supported, a second crown gear axially spaced from said first gear and having a different number of teeth, a magnetic armature extending diametrically across said second gear and connected therewith, resilient means supporting said armature between its ends to permit vibration thereof to move said second gear into mesh with said first gear but preventing rotation of said armature and said second gear, a magnetic element circumferentially spaced from the ends of said armature and resiliently supported by said armature, and electromagnetic means adapted when energized by a pulsating electric current for causing said armature and element to vibrate, thereby producing nutating movement of said second gear and therethrough rotary movement cf said first gear.

7. In an electric motor; a first crown gear rotatably supported, a second crown gear axially spaced from said first gear and having a different number of teeth, an armature extending diametrically across said second gear and connected therewith and having polarized end parts, resilient means supporting said armature between its ends to permit vibratory movement thereof to move said second gear into mesh with said first gear but preventing rotation of said armature and second gear, a pair of polarized magnetic elements aligned on an axis substantially 90 degrees from the longitudinal axis of said armature and on opposite sides of said armature, means resiliently supporting said elements on said armature, and electromagnetic means adapted when energized by an alternating electric current for causing said armature and elements to vibrate, thereby producing nutating movement of said second gear and therethrough rotary movement of said first gear.

8. In an electric motor; an armature comprising a pair of intersecting arms having their end parts polarized, a first gear having pivotal connection with one of said arms at its opposite ends, resilient means continuously urging said gear toward a fixed position relative to said armature about its pivotal connection therewith, resilient means supporting said armature on an axis substantially co-axial with the axis of said gear, a rotary gear co-axial with the armature supported gear and axially spaced therefrom, and electromagnetic means energizable by a pulsating electric current for alternately attracting first one adjacent pair of the polarized ends of said arms and then the other pair, whereby said armature vibrates on its support and brings about nutating movement of the gear supported thereon resulting in rotary movement of the other gear.

9. In an electric motor; an annular armature of permanent magnet material having circumferentially spaced polarized areas arranged in diametrically opposite pairs, a resilient support for said armature, a first gear pivotally connected with said armature on an axis extending through one of said pairs of polarized areas, yielding means continuously urging said gear to a predetermined position relative to said armature about its pivotal connection therewith, a rotary gear co-axial with said armature supported gear and axially spaced therefrom, and electromagnetic means comprising spaced poles adjacent the polarized areas of said armature and adapted when energized by an alternating electric current to bring about vibratory movement of said armature and an accompanying nutating movement of said first gear whereby said second gear is driven in rotation.

10. In an electric motor; a member having angularly spaced polarized areas, means resiliently supporting said member but preventing rotation thereof, a drive element connected with said member so as to be rigid therewith in the plane of vibration of one of said areas and resilient therewith in the plane of vibration of the other of said areas, whereby vibration of said member will cause nutation of said element, a driven element adapted for engagement by said drive element upon nutation of the latter, and electromagnetic means for causing vibration of said member.

WILLIAM L. HANSEN.
JAMES M. HUSH.

REFERENCES CITED

The following references are of record in the file of this patent:

UNITED STATES PATENTS

| Number | Name | Date |
|---|---|---|
| 2,437,904 | Adams et al. | Mar. 16, 1948 |